June 19, 1923.
E. H. WAUGH
1,459,273
FISH SLITTING AND CLEANING MACHINE
Filed Oct. 18, 1921
7 Sheets-Sheet 3
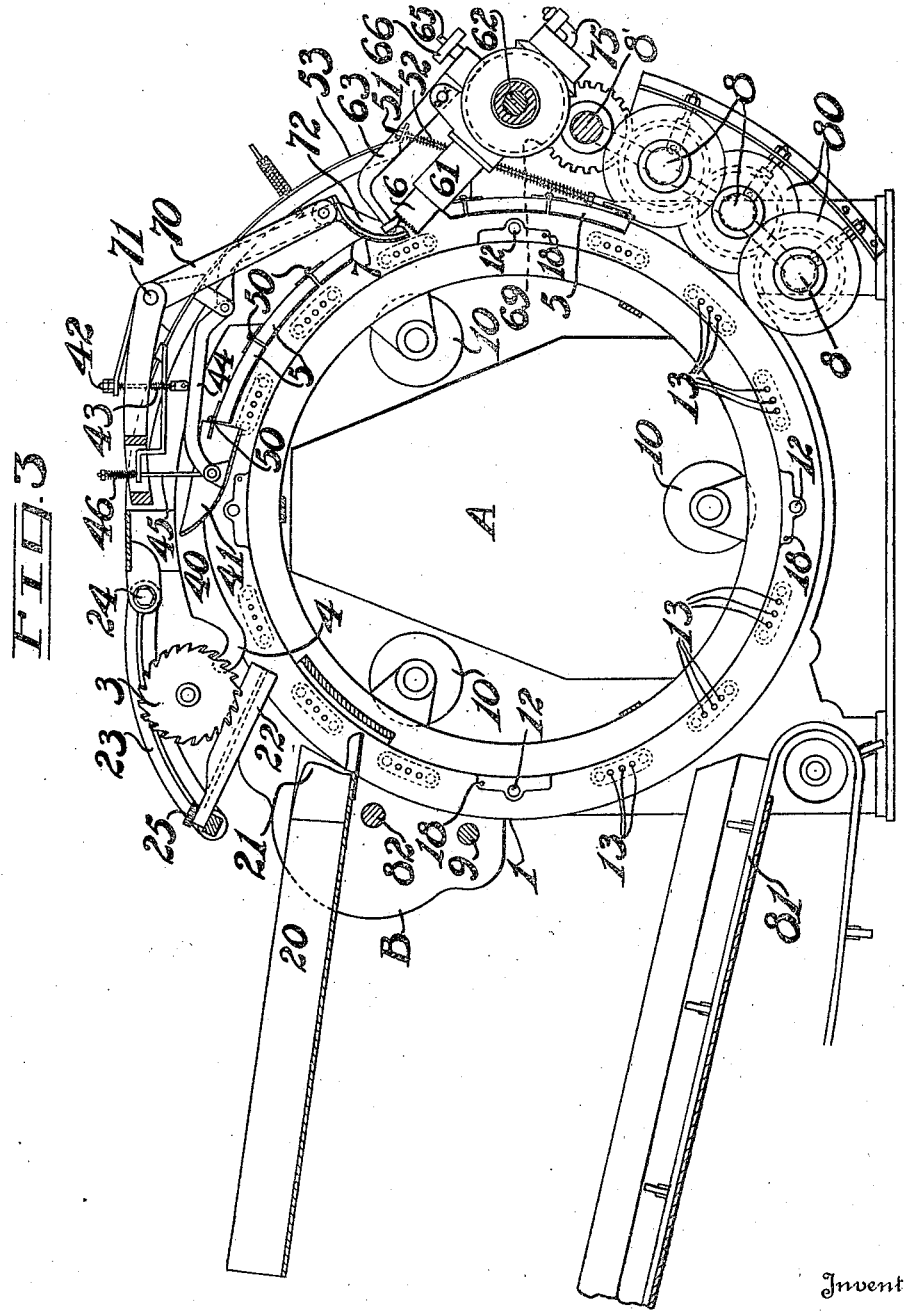
Inventor
Edward H. Waugh
By Reynolds
Attorneys

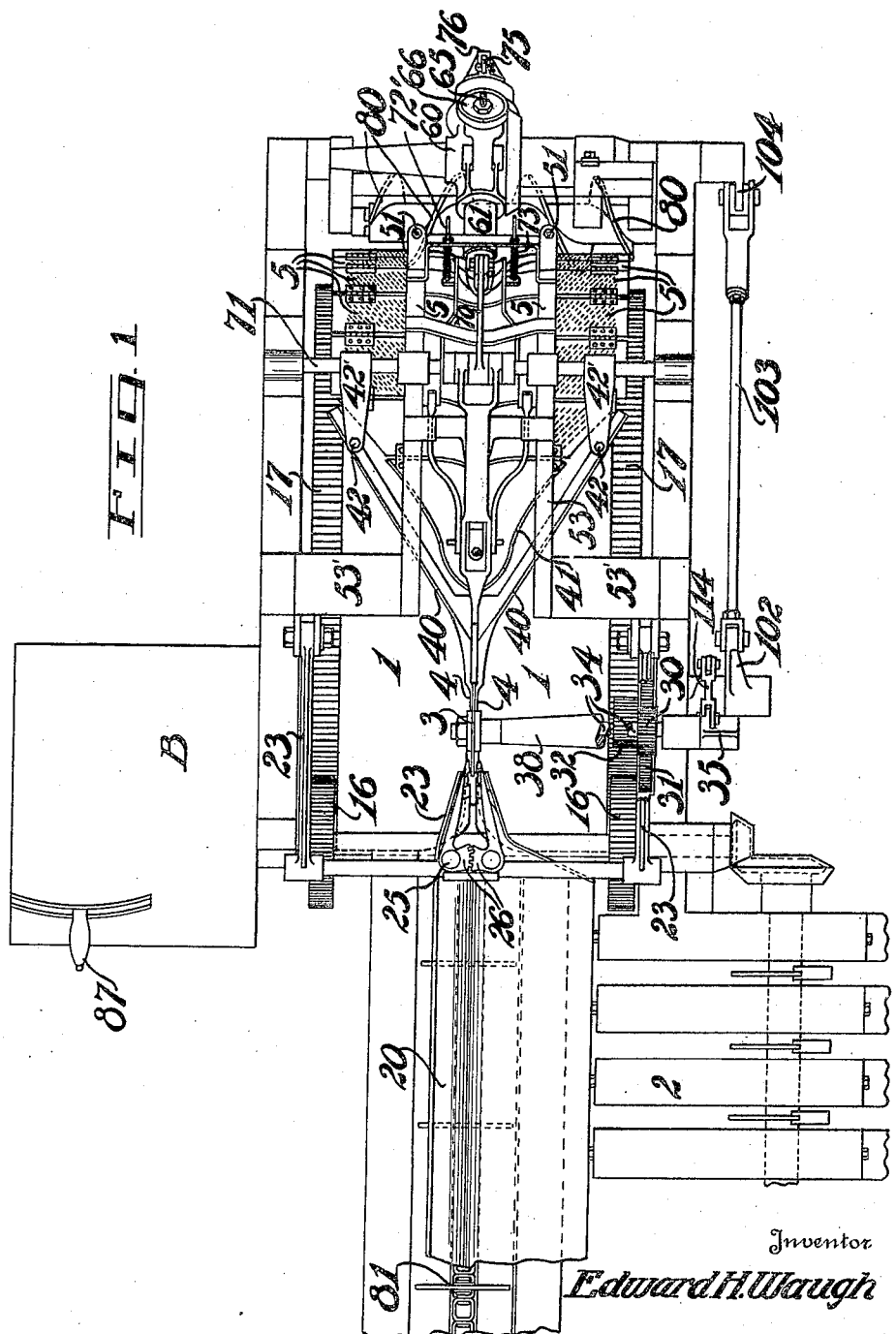

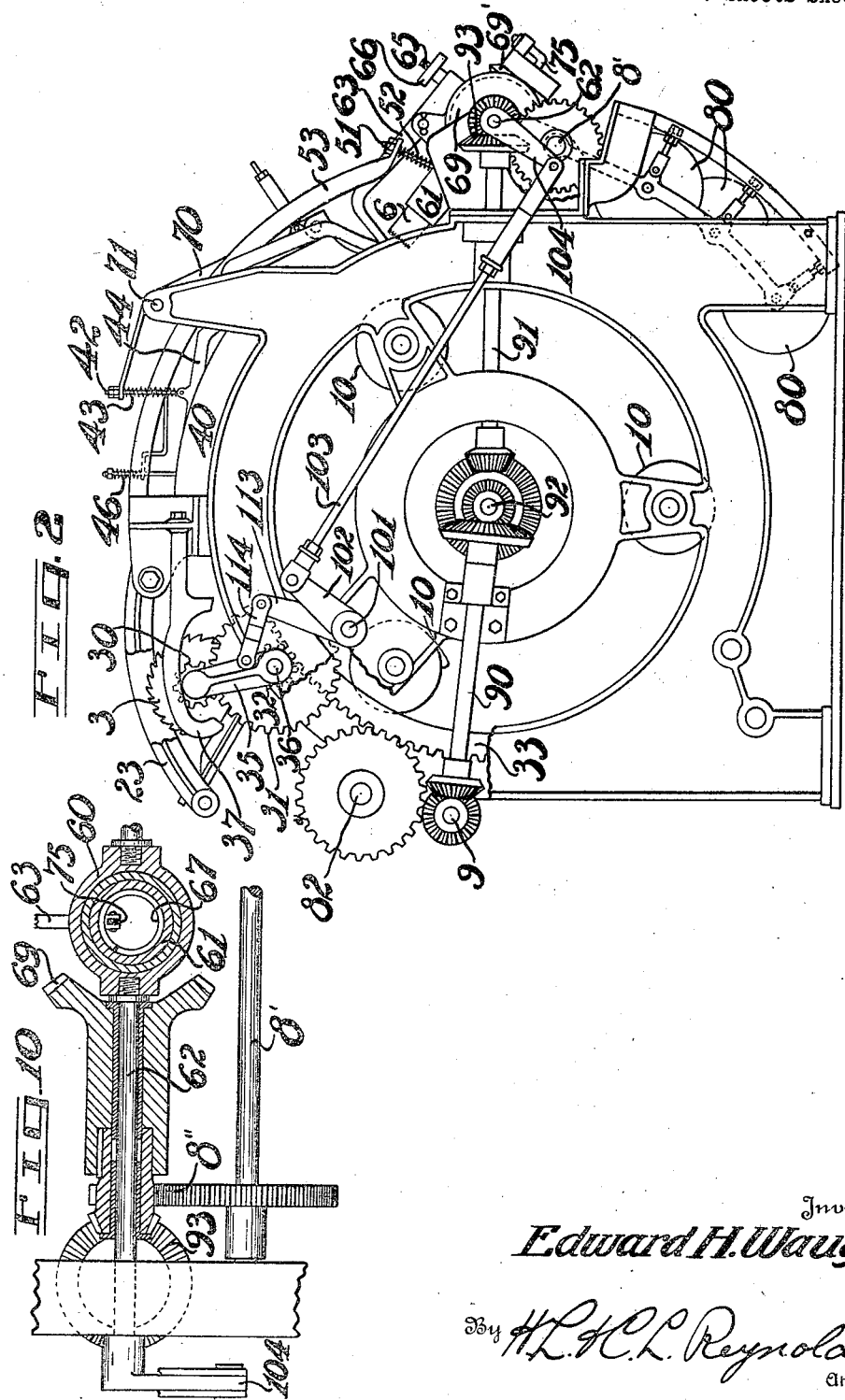

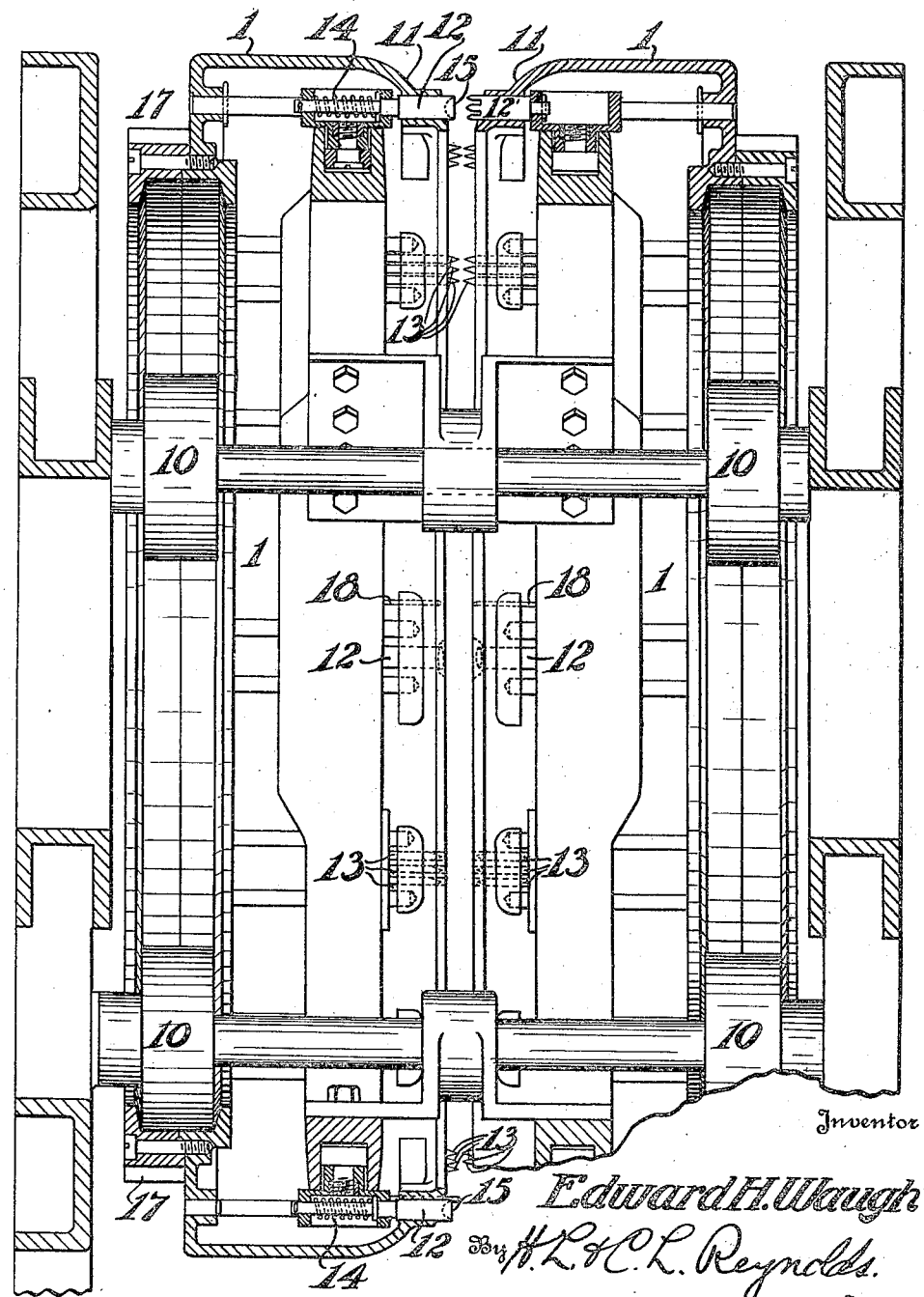

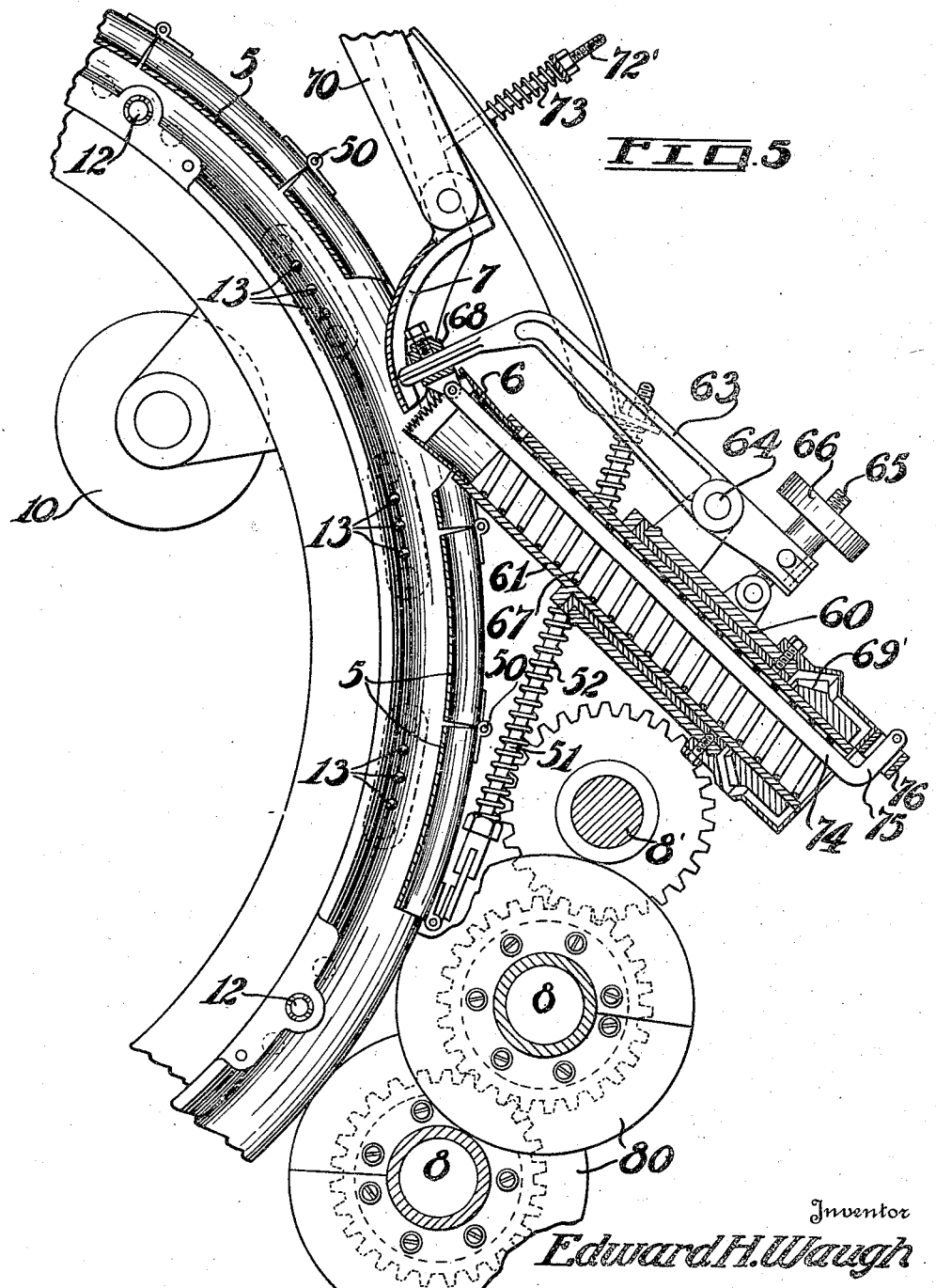

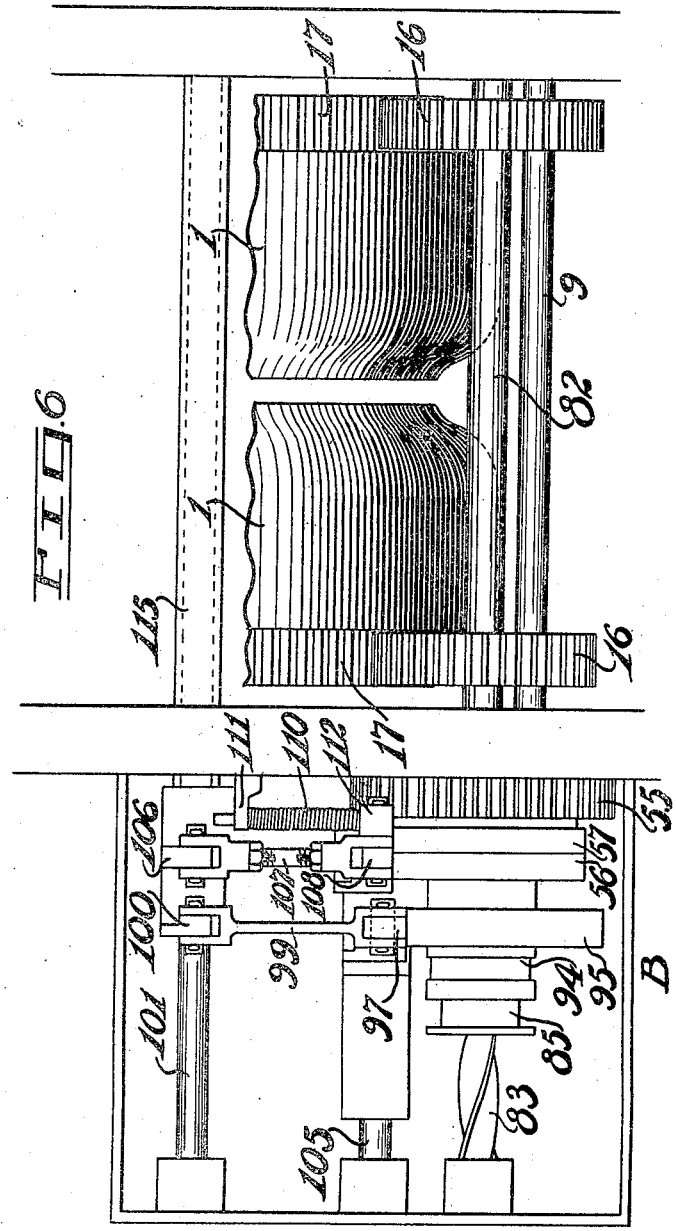

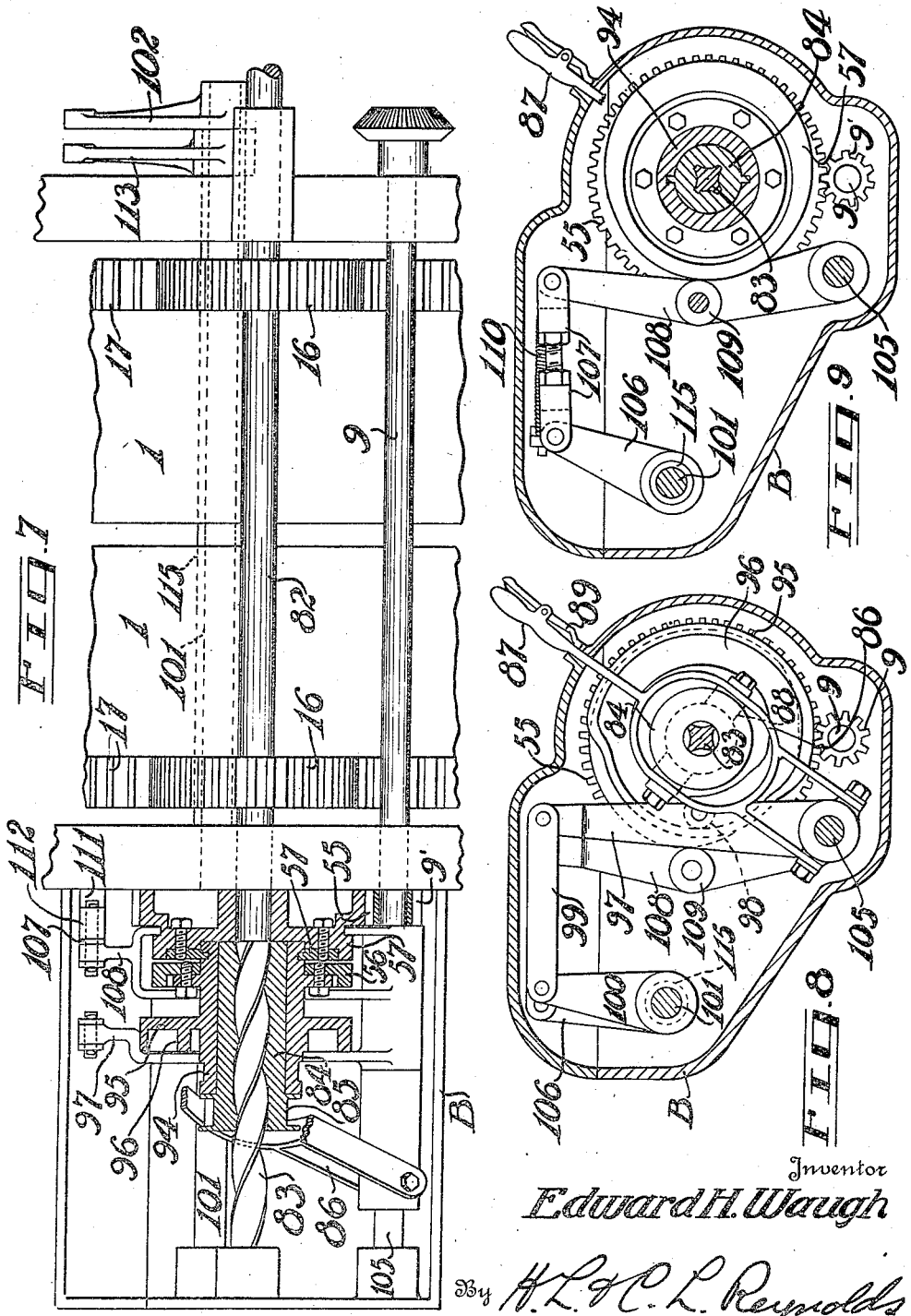

Patented June 19, 1923.

1,459,273

UNITED STATES PATENT OFFICE.

EDWARD HUGH WAUGH, OF SEATTLE, WASHINGTON, ASSIGNOR TO SMITH CANNERY MACHINES CO., OF SEATTLE, WASHINGTON, A CORPORATION OF WASHINGTON.

FISH SLITTING AND CLEANING MACHINE.

Application filed October 18, 1921. Serial No. 508,517.

*To all whom it may concern:*

Be it known that I, EDWARD H. WAUGH, a citizen of the United States of America, and resident of the city of Seattle, in the county of King and State of Washington, have invented certain new and useful Improvements in Fish Slitting and Cleaning Machines, of which the following is a specification.

My invention relates to machines for cleaning or dressing fish and particularly to a machine which is especially designed for cleaning fish in the manner in which it is customary to prepare such fish as cod fish for drying, that is, to the removal of the heads, slitting the fish lengthwise and removing and cleaning the visceral cavity.

The object of my invention is to provide a machine which is dependable in its operation and capable of performing the operations necessary for preparing such fish and one which will do this at a rapid rate.

The objects of my invention in its specific details may be seen from a study of the following description and the drawings to which it refers.

The features of my invention which I believe to be new and upon which I desire to obtain Letters Patent will be specifically defined in the claims terminating this specification.

The accompanying drawings show my invention in the construction which I now prefer to use.

Figure 1 is a top or plan view of the machine.

Figure 2 is a side view of the machine.

Figure 3 is a view of the machine as seen when cut on substantially a central vertical plane.

Figure 4 is a vertical sectional view taken on a plane passing substantially through the transverse axis of the machine.

Figure 5 is a side elevation and partial central section showing a portion of one of the rings which serves as a fish carrier and the mechanism which is employed for cleaning the fish after it has been opened and the mechanism for removing a section of the backbone.

Figure 6 is an exterior view and Figure 7 a longitudinal sectional view of the mechanism employed for operating the backbone removing device and the slitter in order to apply and remove them from the fish and the means for adjusting the timing of such devices.

Figures 8 and 9 are transverse sections showing the cams and their associated mechanisms.

Fig. 10 is a detail section of the backbone removing device.

The present machine is an improvement upon that shown in United States Patent No. 1,365,575, issued to me January 11, 1921. Its general type of construction and operation very closely resembles that shown in the above patent. It is like the machine shown in the above patent in having two bull rings 1 which with their attached mechanisms serve as the fish carriers. These rings are mounted to turn upon rollers 10 and these are so constructed and placed that the two rings turn about a common axis. These rings, as in the machine referred to, are spaced a short distance apart so as to provide a groove or trough in which the body of the fish may be seated in order that it may be securely held while being operated upon. The adjacent outer edges of these rings, that is the edges upon the sides which are towards each other, are beveled or curved inward, as shown at 11 in Figure 4, thus forming a groove or trough having sloping sides for the reception of the main body section of the fish.

In conformity with the machine shown in said previous patent, a beheading device is shown at 2. This is of old construction and a specific description thereof is therefore not deemed to be here necessary. It will suffice to say that the fish are first operated upon by this beheading device to remove the heads and by this device are deposited at the trough 20 which serves as a guide for the correct application of the fish to the cleaning device. At the end of this trough which is adjacent to the carrier 1 I have provided at each side a centering plate 21, the ends of which plates adjacent to the carrier are free to be pressed laterally by the fish in passing through. These plates have their inner or free end, that is, the end which is next to the carrier, close together when not under strain. They therefore serve to insure the accurate placing of the fish so far as the horizontal position transversely of the machine. The tail end of the fish is presented to the carrier, the fish at the time being in substantially horizontal position, or a direction which approximates to a radial position with relation to the carrier. Preferably, however, this is not a true radial position but is somewhat inclined thereto, as has been illustrated in Figure 3.

The fish when presented to the machine has its tail end inserted by hand between the two rings 1 which form the carrier. The carrier is provided with tail pinchers or pins 12, which are mounted so as to rotate about their axis and means are provided for reciprocating these so as to project them into and withdraw them from the space between the two rings. This is done by a cam mechanism which was illustrated and fully described in the patent referred to and therefore need not be herein fully described. This is timed to act so that the tail pinchers or pins 12 are projected so as to catch the tail of the fish and thus carry it about with the ring. As a result of this the body of the fish will be laid in the groove between the two rings 1. The body of the fish will then be engaged by the supplemental or main holding pinchers or pins 13 which are also mounted to reciprocate transversely of the gap between the rings and are designed to enter the backbone section of the fish at points distributed along its length. This mechanism being also essentially the same as that shown in the said patent before referred to, need not be herein described in detail.

The pinchers or pins 12 which engage the tail end of the fish differ in a minor way from those shown in said patent referred to. This difference is illustrated in Figure 4. It consists in constructing the pin 12 so that it may yield backwardly and normally holding it projected by a spring 14 so that under sufficient resistance it may be forced backward a slight distance. In other words, this pin is mounted so that it is projected into the fish or into engagement with the fish in a yielding manner so that, if the fish be especially thick, the pin will yield backward. In other words, the movement of this pin is made variable under the action of a spring instead of being positive at all times. Also the end of this pin is made as a cup, the end being provided with a concavity as is illustrated at 15 in Figure 4.

The fish as it leaves the feeding trough or chute 20 and after being secured to the carrier, passes between two centering arms 22 which arms or plates are supported from a swinging arm 23 which latter arm is pivoted at the point 24. These centering arms or plates 22 engage the fish at each side, holding it central so as to be accurately engaged by the slitter, which slitter is herein shown as a revolving or circular saw 3. The centering arms 22 are rigidly held so far as swinging in the same plane as the slitter saw 3, except for the swinging due to the motion of the carrying arm 23. They are, however, pivotally mounted upon the outer end of this carrying arm 23 by pivots 25 which are substantially perpendicular to the plane of these two arms. These arms 23 are connected each with the other so as to move uniformly toward and from the central plane, by means of two intermeshing toothed segments 26. Normally these arms are held towards the center by spring action.

The slitter saw 3 is rotated through a train of gears which includes the gears 30, 31, and 32, the latter meshing with a large gear 33 which is secured to turn with the carrier rings 1. The slitter saw is mounted upon a shaft 34 which extends transversely of the machine and this is journaled in a swinging arm 35, mounted to swing upon the same axis 36 as that which carries the pinion 32. The slitter 3 is thus capable of being moved toward and from the fish upon the carrier. Such movement is limited in its amount by an arm 37 which is provided with stops positioned to engage the sleeve 38 in which the shaft 34 is journaled. This sleeve 38 is secured to or forms a part of the swinging arm 35.

The swinging movement of the slitter saw is automatically secured and the action thereof is timed so as to advance the saw to the fish and hold it in position for slitting the fish throughout a definite predetermined portion of the length of each fish as it is carried along by the carrier. This result is secured by the use of cams which are timed with the passage of the fish, that is, the cams are timed so as to complete one entire cycle during the time it takes for each fish to pass beneath the slitter saw. In the machine herein illustrated which is provided with means for holding four fish upon the complete circle of the carrier, the cam would have a complete throw and return movement four times for each revolution of the carrier.

The construction of the cam mechanism is shown in detail in Figures 6 to 9 inclusive. The shaft 9 which extends across one edge of the carrier just beneath the fish feeding trough 20, is driven in any suitable way from the source of power. As the machine is herein illustrated and particularly as shown in Figure 2, this shaft 9 is driven from a shaft 90 through bevel gears mounted upon each, and the shaft 90 is also driven through bevel gear connection from a shaft 92 which is either the shaft of a small motor or is geared to the shaft of a motor. The manner however of giving rotation to the shaft 9 would vary in accordance with the conditions of operating and installing the machine. While the device as illustrated in Figures 2 and 3 is designed to be operated by an individual motor which is located within the circle of the bull wheels or carrier rings 1, the machine may be driven by a belt from some outside source of supply or in any other suitable manner.

The shaft 9 extends into a casing B which is located at one side of the machine. It carries, secured thereto, a driving pinion 9' which pinion meshes with a gear wheel 55 which is in turn secured to a shaft 82. This shaft 82 also extends across the face of the machine and has mounted upon that portion of it which is within the casing B, the mechanisms which carry and adjust the cams by which both the slitter saw 3 and the backbone removing saw 6 are operated to cause them to advance and recede from the fish in passing.

A cam 57 is formed as an integral part of the gear 55; or may be made separate therefrom and fixed thereto. A cam 56 which is essentially the same as the cam 57, at least in having the same throw and having a like inclined advance end for the engagement of the cam roller, is mounted concentric with the gear 55 so that it may be angularly adjusted with respect to the cam 57. It is evident that by having two cams of this character side by side, if one of them be angularly adjusted with relation to the other, the duration of the period of cam throw may be increased or decreased by adjusting the one cam forward or backward.

The two cams 56 and 57 engage a common cam roller 109 carried by a lever arm 108 which arm is pivoted upon the shaft 105. This arm is shown as acted upon by a compression spring 110 which acts between the fixed arm 111 and an arm 112 carried by the outer end of the arm 108, so as to at all times hold the rollers 109 against the outer periphery of the cams. The lever arm 108 is connected with a crank arm 106 by a link 107, which link is of compound construction in which a central section is made right-and-left hand threaded and screwing into the end sections, so that the length of this connecting rod may be adjusted. The crank arm 106 is secured to a sleeve 115 which is mounted to turn upon a shaft 101. This sleeve extends through the central opening in the two carrier rings 1 and at the opposite side of the machine has secured thereto a crank arm 113 which is connected by a link 114 with the swinging arm 35 upon which the shaft of the slitter saw is journaled. It is evident that a throw given to the lever arm 108 by the action of the cams thereon, will be communicated through the mechanism described to the frame 35 so as to cause the slitter saw 3 to be swung towards and from the carrier and the fish thereon. It is also evident that if one of these cams, as the cam 56, be angularly adjusted relative to the cam 57, the period during which it will be held in engagement with the fish will be lengthened.

The end of the shaft 82 has mounted thereon a sleeve 84. This sleeve and the shaft are connected together in such manner that there may be relative movement between the two lengthwise of the shaft and also so that such relative movement will also cause an angular movement between the two. The means illustrated for securing this consists in making this section of the shaft 82 of non-circular cross section and twisted so as to form a helix and making the hole through the sleeve 84 of corresponding character. In other words, this section of the shaft is in effect a threaded section of a bolt and the sleeve is a nut fitting thereon, the pitch of the threads being quite a high pitch.

The sleeve 84 and the surrounding sleeve 94 which is mounted thereon, are keyed together so that there is no relative angular movement between them. The sleeve 84 has a groove 85 formed therein, which groove contains two rollers 88 carried by the sides 86 of the adjusting lever 87. The sleeve 84 may, however, freely slide lengthwise in the sleeve 94. When, therefore, the lever 86 which is pivotally supported on a rod 105 is operated so as to move the sleeve 84 lengthwise of the shaft, it will be caused to turn relative to the shaft by reason of the helical character of the surface of the section 83. As the sleeve 94 is keyed upon the sleeve 84, said sleeve 94 and the two cams 56 and 95 carried thereby will be given an angular movement relative to the shaft and also to the cam 57.

The cam 95 has in one side face thereof a cam groove 96 into which enters the roller 98 carried by the pivoted lever 97. This lever 97 is connected by a link 99 with a crank arm 100, which is fixed to the shaft 101 upon the other end of which is secured the arm 102 which latter is secured to the pivoted frame in which the sleeve 61 carrying cutter 6 is mounted to rotate. Through this mechanism the backbone removing tube is thus caused to swing towards and from the fish upon the carrier. This is timed so as to cause the cutter to engage the fish at the desired point and to remain in engagement until the remainder of the backbone of the fish has been removed. Where the fish is a large one the point at which the removal of the backbone is to commence will be farther from the tail and from the point where the tail end of the fish is engaged by a single pin 12, than would be the case if the fish were a short or small one.

By the means just described the machine may be adjusted so as to leave a uniform percentage of the backbone at the tail end thereof, although the total length of the fish may vary considerably. The adjustment of the cam which controls the slitter saw is dictated by the same reasons, namely, the length of the fish and the desire to have the slitting action not commenced too soon, that is, too near the tail of the fish. The lever 87 is provided with a catch 89 of a customary type which is adapted to hold it at whatever point it is adjusted. The adjustment of the machine to accommodate for variation in the length of the fish is a hand adjustment and depends upon the judgment of the operator. It is designed that the fish be sorted to such an extent as to operate upon the shorter fish at one time and the longer fish at another time, it is therefore not necessary to adjust these cams for each fish.

Situated so as to engage the fish immediately after being slit by the saw 3 are two members which at their forward end are in the form of plates 4 parallel with and close against the sides of the slitter saw 3. These form separators which enter the slit in the belly of the fish produced by the saw 3. As these members extend away from the saw they form V-shaped or diverging scraper plates 40. These act much in the nature of a plow and are curved at their under side so that they fit against the inner surface of the fish which has been opened by the saw. They thus spread and open the fish after it has been split and scrape the visceral contents from the fish. The fish is thereby in the main cleaned of its viscera.

Supplemental scrapers or cleaners are shown at 41. The scrapers 40 are supported towards their rear end by means of rods 42 and are yieldingly held down upon the fish by springs as 43 which are shown as surrounding the rods 42. Any suitable means for yieldingly holding them in contact with the fish as it is passing beneath them will answer.

The supplemental scraper 41 is mounted upon an arm 44 which is pivoted at 45 upon some convenient point of a supporting frame so that it may swing in a vertical plane. This scraper is also connected with a rod 45 at or adjacent to the forward end of the arm 44, and this is controlled in its pressure upon the fish by means of a spring 46. In the case of the scraper 41 this spring serves to hold it up from the fish, this being due to the fact that as the other parts are constructed and attached to the scraper 41, the normal tendency is to press upon the fish with too great force. The action of the spring, however, would be adjusted either to press the scraper upon the fish or to lift it from the fish in accordance with the requirements of the particular construction employed.

A series of scrapers in the form of a metal belt are employed for the final cleaning of the inner surface of the fish. These consist of a series of plates 5 which are hinged to each other and are also curved so as to conform to the peripheral curve of the fish carrier and of the outer surface of the fish as held upon said carrier. The first plate of this series is shown as hinged to the scraper 41 by a hinge 50. Similar hinges 50 connect the various sections of this scraper. The lowermost section 5 of this scraper has secured thereto a rod 51 which at one end is held in position by a frame member as 53. A spring 52 surounding this rod serves to hold down the lower section 5 and to apply the slight pressure which is necessary to secure satisfactory cleaning action.

In operating upon such fish as cod it is customary to remove the larger portion of the backbone, that is, that portion of the backbone extending from the head to a point close to the tail. For securing this result I employ a rotative cutter 6. This in its main features of construction and operation is similar to the cutter illustrated and described for the same purpose in said prior United States Patent No. 1,365,575. Detailed description of this in all its parts is therefore not thought to be essential at this point. It will suffice to say that the device fundamentally consists of a rotating tube having a cutting forward end edge, which tube is operated so as to engage with the fish and remove a section which contains the desired amount of the backbone, as the fish is passing beneath it. It is also, as described in said patent, controlled so as to be lifted at the proper point to therefore not remove the backbone in the tail section of the fish. Except as herein otherwise described, the construction of these parts is supposed to be the same as is described and illustrated in said patent.

The nonrotative frame 60 in which the tube 61 is mounted to turn, is mounted to swing upon a pivot center at the point 62. The cutting member of this device consists of a removable tubular section 6, which is at its forward end provided with cutting teeth. This is rotated through a train of gears in the manner described in said previous patent, of which the gears 69 and 69' form the final pair.

In connection with this device and controlling the depth of cut by the thickness of the fish, I employ a presser. This has a curved plate 7 which is carried by an arm 70 pivoted at the point 71 upon some frame member. This is of such a width that its end may enter the end of the cutter 6. Along with this are supplemental plates 72, these however being laterally separated from the central section 7 a sufficient distance that they will pass outside of the cutter 6 and thus not interfere with its action. A rod 72' and spring 73 serve to regulate the pressure of the presser upon the fish.

An arm 63 is pivoted at 64 upon the frame 60 which carries the rotative cutter. The forward end of this is bent over and extends down in front of the cutter 6. This is designed to rest upon and be supported by the presser 7. It is also adjustable in position with relation to the axis of the revolving cutter tube, by means of the bolt 65 and the threaded hand wheel 66, after the manner described in said previous patent. It is thus obvious that the position of the cutter is controlled through the engagement of the presser 7 with the fish, the cutter being raised by a thick fish. By reason of the restricted width of the presser 7 its end may freely enter the cutter tube as necessary by the upward swing of the parts.

Within the cutter tube 61 I provide a helically disposed rib which, by reason of the rotative movement of said tube, acts upon the backbone strip which has been cut from the fish to cause a positive rearward feeding action thereon. In order to insure such feeding action it is necessary to prevent the backbone strip from revolving with the tube. I therefore provide a fixed stop which will prevent such rotation. Such stop as illustrated consists of a bar 74 which extends through the tube, one end being supported by a lateral bent section 75 which passes through an eye 76 carried by the stationary frame 60. The other end is supported from arm 63. As illustrated it is shown as pivotally connected with the block 68 which is adjustably secured to the forward downwardly extending end of the arm 63. This rod or bar will prevent the backbone strip from being carried around with the tube 61 in its revolution and therefore insure its positive discharge at the rear and prevent blocking of the tube by several of these strips becoming wedged therein.

Following in order after the scraper plates 5 I have shown a series of brushes which engage with the opened inner surface of the fish. These brushes consist of flexible webs which are secured in helical position to rotating shafts. They therefore form what resembles a screw thread. These shafts 8, of which three are shown, are revolved by suitable gear connections, as from the shaft 8', which is in turn driven by gears 8" from the spindle of gear 69. The brush portion 80 may be made of a number of layers of canvas which have been stitched or otherwise secured together. They thus form a yielding brush and the helical position thereof serves to brush the fish from the central line outwardly so as to remove any particles of skin or other matter which may still be retained by the fish. The fish after being acted upon by these mechanisms reaches the point at or just above the delivery belt 81 where the holding pins 12 and 13 are released by the cam action so that the fish is deposited upon said belt and is conveyed away.

In the preparation of such fish as cod for drying, custom demands that the fins and tail be intact and immutilated. For this reason devices such as used in preparing salmon for canning, which devices remove the fins and tails, have not been installed upon this machine.

To prevent mutilation of the tail by the slitter saw 3, I have provided a protecting finger or pin which holds the tail fin down. This is shown as a pin 18 which is mounted to reciprocate, either in exact or approximate conformity with the pincher or tail holding pin 12. The pin 18 is located in advance of the pincher 12 and close enough thereto to be engaged by the fish tail as the fish swings into position between the two carrier rings 12. The upper side of the tail fin is therefore held down so that it is not engaged by the slitter 3. I consider the use of any device for protecting the tail from mutilation by the slitter as essential only to the extent to which this result is essential in meeting the demands of the trade. In other words, it is done only to satisfy trade requirements.

What I claim as my invention is:

1. In a fish dressing machine, a movable carrier, fish holding means comprising pairs of alined pins mounted for longitudinal reciprocation towards and from each other to engage the fish, means for automatically reciprocating said pins and a spring between one pin of the pair and its reciprocating member.

2. In a fish dressing machine, fish holding devices comprising pairs of alined and reciprocable pins and a spring acting as a thrust support for one pin of a pair.

3. In a fish dressing machine, fish holding devices comprising pairs of alined and reciprocable pins mounted for turning and a spring acting as a thrust support for one pin of a pair.

4. In a fish dressing machine, fish holding devices comprising pairs of alined and reciprocable pins, one pin of each pair having a circular end flange and a thrust spring acting upon said pin to permit its yielding.

5. In a fish dressing machine a movable fish carrier, pin carriers mounted upon said fish carriers to reciprocate transversely of the direction of movement of said carrier, means for reciprocating said pin carrier, fish holding pins mounted to reciprocate in their carrier, and a spring acting to hold said pins projected.

6. In a fish dressing machine, a movable fish carrier, a rotating tubular cutter adapted to cut a strip from the fish in passing, and a non-rotative rod passing lengthwise through said cutter.

7. In a fish dressing machine, a movable fish carrier, a rotating tubular cutter having its axis inclined to the direction of movement of the fish in passing, and a helical rib carried by the inner surface of said tube.

8. In a fish dressing machine, a movable fish carrier, a rotating tube carrying a cutter at one end and adapted to engage the fish in passing to remove a strip therefrom, a feed worm within and rotating with said tube and a bar extending lengthwise within the tube and held against rotation.

9. In a fish dressing machine, a movable fish carrier, a rotating tube carrying a cutter at one end and adapted to engage the fish in passing to remove a strip therefrom, and means actuated by the turning of said tube to feed the removed strip rearwardly.

10. A backbone removing device for fish dressing machines comprising a tube mounted to rotate about its longitudinal axis and having a cutting edge at one end, means for swinging said tube about a transverse axis, and means for securing a positive feed of the removed strip rearward through said tube.

11. A backbone removing device for fish dressing machines comprising a tube mounted to rotate about its longitudinal axis and having a cutting edge at one end, means for swinging said tube about a transverse axis, a presser connected with said tube to control the depth of its cut, and means for securing a positive feed of the removed strip rearward through said tube.

12. A backbone removing device for fish dressing machines comprising a tube mounted to rotate about its longitudinal axis and having a cutting edge at one end, means for swinging said tube about a transverse axis, a presser mounted independently of said tube and engaging the fish just in advance of the cutting end of said tube and an arm connected to swing with said tube and having sustaining engagement with said presser.

13. A backbone removing device for fish dressing machines comprising a tube mounted to rotate about its longitudinal axis and having a cutting edge at one end, means for swinging said tube about a transverse axis, a presser forwardly of and adapted to enter the cutting end of said tube, and means connecting said presser and tube to control the depth of cut of said tube.

14. A backbone removing device for fish dressing machines comprising a tube mounted to rotate about its longitudinal axis and having a cutting edge at one end, means for swinging said tube about a transverse axis, a presser hinged forwardly of said tube and adapted under mutual swinging action to enter the cutting end of said tube, and means linking said presser and cutting tube to swing together.

15. A backbone removing device for fish dressing machines comprising a tube mounted to rotate about its longitudinal axis and having a cutting edge at one end, means for swinging said tube about a transverse axis, a presser hinged forwardly of said tube and adapted under mutual swinging action to enter the cutting end of said tube, means linking said presser and cutting tube to swing together, and additional pressers located at each side of the first named presser and separated therefrom to not interfere with the cutter.

16. A backbone removing device for fish dressing machines comprising a rotatively mounted tube having an end cutting edge and means for swinging said tube about a transverse axis, a presser engaging the fish in advance of the cutter, a bar extending through said tube and a support for one end of said bar from the presser.

17. In a fish dressing machine, a rotative tube having an end cutting edge, a scraper bar extending through said tube and held against rotation, and means for adjusting the position of said bar transversely of the tube.

18. In fish dressing machines, means for removing a strip from the fish comprising a rotative tube having an end cutting edge, a helical rib on the inner surface of said tube, a non-rotative bar within said tube and means for adjusting the position of said bar transversely of the tube.

19. A means for removing a strip from a fish comprising a rotative tube having an end cutting edge and a scraper bar extending lengthwise of and within said tube and held against rotation.

20. A means for removing a strip from a fish comprising a rotative tube having an end cutting edge, a helical rib carried by and within said tube, and a non-rotative bar extending lengthwise within said tube.

21. In a fish dressing machine, a fish holding means comprising a carrier, fish engaging and holding pins reciprocably mounted on said carrier and a fin holding means carried by the carrier.

22. In a fish dressing machine, a fish carrier, a fish slitting means and means for holding the tail fin out of the path of action of the slitting means while passing the same.

23. In a fish slitting machine, a movable fish carrier, a slitter and a tail fin guard.

24. In a fish slitting machine, a rotative fish carrier, a slitter and a tail fin guard carried by said carrier.

25. In a fish slitting machine, a movable fish carrier, fish holding means carried by the carrier and movable to engage and release the fish, a slitter and a tail fin guard adapted to hold the tail fin out of the path of action of said slitter.

26. A fish slitting machine as above defined in which the fin tail guard is movable in conformity with the movements of the fish holding means.

27. A fish slitting machine having reciprocable fish holding means and a tail fin guard secured to move with one of said fish holding means.

28. In a fish slitting machine, movable carriers, a slitter, fish holding means comprising pins reciprocable on said carriers, certain of said pins being mounted to also turn about their longitudinal axis, and a pin mounted to reciprocate with each of the latter pins and adapted to hold the fish tails out of contact with the slitter.

29. In a fish slitting machine, a fish carrier having two opposed and synchronously rotated rings, fish holding pins carried by said rings and reciprocable to project into and be withdrawn from the space between said rings, a slitter acting upon the fish as held by said pins, and tail protecting pins secured to reciprocate with those pins which engage and hold the tail end of the fish to prevent engagement of the slitter with the fish tail.

30. In a fish slitting machine, a fish carrier having two opposed and synchronously rotated rings, fish holding pins carried by said rings and reciprocable to project into and be withdrawn from the space between said rings, a slitter acting upon the fish as held by said pins, and tail protecting pins secured to reciprocate with and positioned in advance of those pins which engage and hold the tail end of the fish to prevent engagement of the slitter with the fish tail.

31. In a fish slitting machine, a movable carrier having a groove in which the fish is seated for slitting, a slitter acting upon the fish in passing, fish holding pins movable transversely of said groove to engage the fish and mounted to turn to permit the fish swinging into said groove from a position extending outwardly therefrom, and a tail protector extending across said groove in position to hold down the tail fin when the fish swings into said groove.

32. A fish slitting machine comprising a rotative carrier having a groove in which the fish is seated, means for guiding a fish tail end first into said groove in a position which is substantially radial of the carrier, holding pins upon the carrier movable transversely of said groove to engage the tail end of the fish, a pin movable with and located in advance of said holding pin and adapted to hold down the tail fin when the body of the fish swings into the groove in the carrier.

33. A fish slitting machine having a movable carrier provided with a groove in which to seat the fish for slitting, a slitter positioned to engage the fish in passing, means for presenting the fish to insert its tail end in said slot while extending outwardly from the carrier, fish holding pins movable transversely of said groove to engage the tail end of the fish and a tail protecting pin movable with and located in advance of said holding pins whereby when the fish swings into the seating groove in the carrier the tail fin is held out of engagement with the slitter.

34. In a fish slitting machine, a fish carrier, a slitting saw, means for moving said saw towards and from the fish to act upon selected portions of the length of the fish, and means for varying the duration of the period of engagement of the saw with the fish.

35. In a fish slitting machine, a fish carrier, a slitting saw, means for moving said saw towards and from the fish to act upon selected portions of the length of the fish, and a cam provided with an adjustable throw member whereby to adjustably determine the duration of the period of engagement of the saw with the fish.

36. In a fish slitting machine, a movable carrier, means for securing the fish to said carrier for lengthwise movement, a slitting saw, a frame for said saw pivoted to carry the saw toward and from the carrier, a cam for swinging the saw frame and geared to turn in conformity with the carrier, whereby the fish are slit for a predetermined portion of their length.

37. In a fish slitting machine, a movable carrier, means for securing the fish to said carrier for lengthwise movement, a slitting saw, a frame for said saw pivoted to carry the saw toward and from the carrier, a pair of cams, common actuating means connecting the cams with the saw frame to swing it and means for shifting the relative angular position of said cams to vary the duration of swing of the saw frame.

38. In a fish slitting machine, a movable carrier, means for securing the fish to said carrier for lengthwise movement, a slitting saw, a frame for said saw pivoted to carry the saw toward and from the carrier, a cam and means operatively connecting it with the saw frame, a second cam concentrically mounted alongside the first cam and having a like throw therewith, and means for rotatively shifting one of these cams to vary the duration of the cam throw.

39. In a fish dressing machine, a rotative fish carrier, and scrapers comprising a series of plates hinged together and fitting over an arc of said carrier and provided with scraping surfaces at their inner face.

40. In a fish dressing machine, a rotative fish carrier, a series of scraping plates hinged together and curved to fit the curve of said carrier, said plates having slots therein and flanges shaped from one side of the slots.

41. In a fish dressing machine, a rotative fish carrier, a series of scraping plates hinged together and curved to fit the curve of said carrier, said plates having diagonally positioned slots and flanges formed by turning down the metal at one side of the slot, and yielding tensioning means for said plates.

42. In a fish dressing machine, a rotative fish carrier, a scraper comprising a series of hinged plates fitting the curve of said carrier, means for applying a yielding tension to the rear end of said scrapers to hold them upon the fish.

43. In a fish dressing machine, a rotative fish carrier, and a brush comprising a rotative shaft extending across the path of the fish and a helically disposed flexible web carried by said shaft.

44. In a fish dressing machine, a rotative fish carrier, and a brush comprising a rotative shaft extending across the path of the fish and right-and-left pitched helically disposed flexible webs carried by the shaft.

Signed at Seattle, Washington, U. S. A., this 23rd day of April, 1921.

EDWARD HUGH WAUGH.